H. C. HOLDEN.
PROCESS OF OBTAINING STARCH.
APPLICATION FILED JULY 3, 1916.
1,221,990.
Patented Apr. 10, 1917.
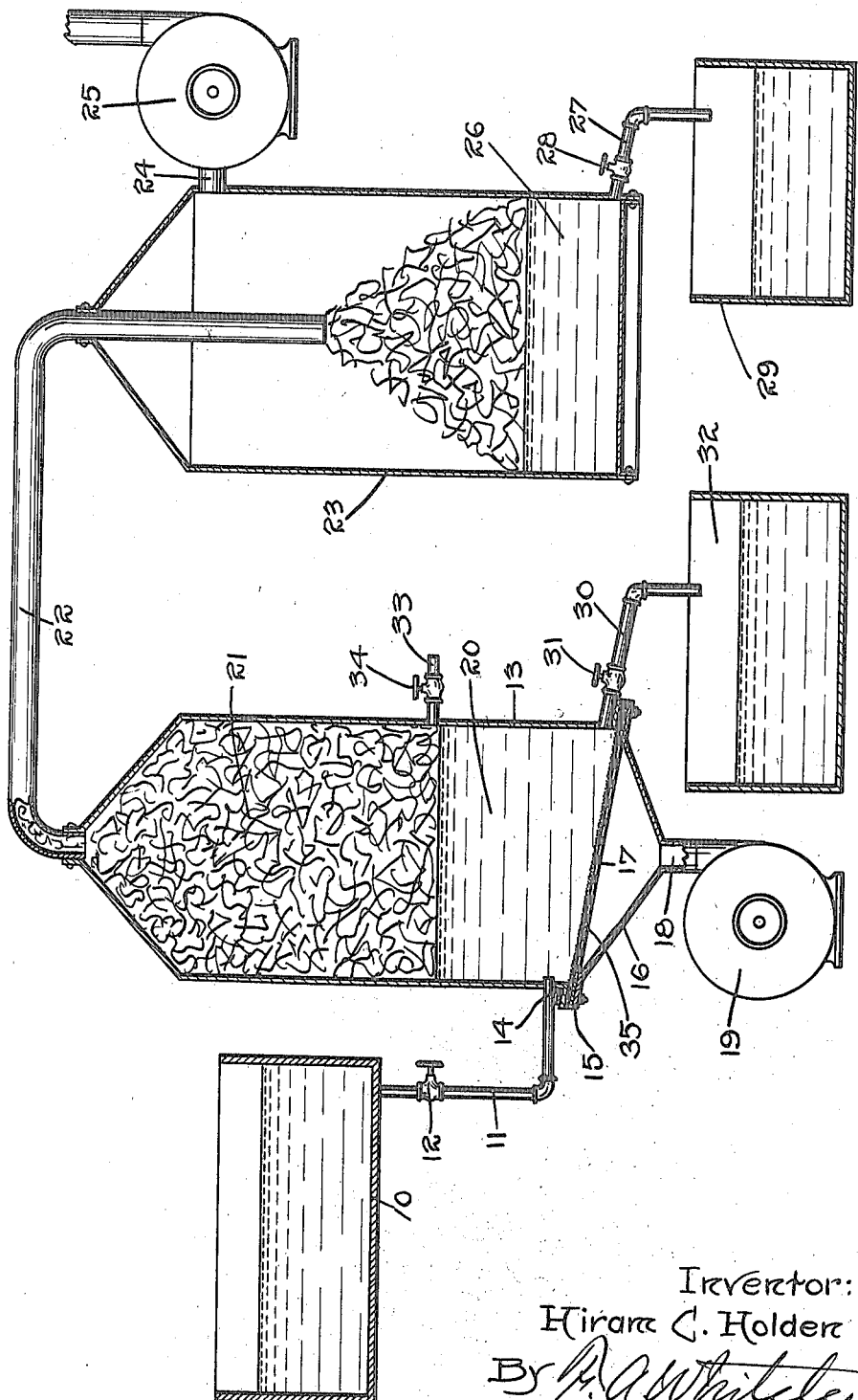
Inventor:
Hiram C. Holden
By R. A. Whiteley
his Attorney.

UNITED STATES PATENT OFFICE.

HIRAM C. HOLDEN, OF PITTSBURGH, PENNSYLVANIA, ASSIGNOR TO WASHBURN CROSBY COMPANY, OF MINNEAPOLIS, MINNESOTA, A CORPORATION OF MINNESOTA.

PROCESS OF OBTAINING STARCH.

1,221,990. Specification of Letters Patent. Patented Apr. 10, 1917.

Application filed July 3, 1916. Serial No. 107,297.

*To all whom it may concern:*

Be it known that I, HIRAM C. HOLDEN, a citizen of the United States, residing at Pittsburgh, in the county of Allegheny and State of Pennsylvania, have invented certain new and useful Improvements in Processes of Obtaining Starch, of which the following is a specification.

My invention relates to the process of obtaining starch and has for its object the provision of a process wherein crude starch liquor obtained from grains such as wheat, corn, rye, etc., or other sources, and which contains a mixture of starch, gluten, fibrous material and other impurities suspended in water, is treated so as to cause the removal therefrom of the gluten, fibrous material and impurities, leaving the starch in the liquor, from which it may be readily separated by usual methods.

As practised heretofore, the separation of the gluten and fibrous material from the starch has depended upon the differences of the specific gravity of the substances and has been effected by the employment of settling or centrifugal apparatus. Such processes have, however, been found to be unsatisfactory for certain liquors, especially those derived from the lower grades of flours or meals of the different grains. I have found that by causing the liquor to froth, the gluten and fibrous material is separated from the starch solution and is carried with the bubbles or froth and may hence be removed therefrom. In carrying out my invention I employ a reservoir for containing the crude starch liquor having a bottom formed of a permeable material through which a blast of air is forced. A voluminous froth is in this manner produced which rises to the top of the liquid carrying with it the undesirable materials, which froth is removed from the top of the reservoir by means of suction.

The full objects and advantages of my invention will appear in connection with the detailed description thereof and are particularly pointed out in the claims.

In the drawings, illustrating the application of my invention in one form,—

The drawing illustrating the application of my invention is a diagrammatic view of an apparatus which may be employed in the practice of the invention of my process.

The starch liquor may be procured by any of the usual methods and contains prior to purification gluten, nitrogenous and fibrous material which are of the nature of impurities. The crude starch liquor is first poured into a storage reservoir 10 provided at the bottom with an outlet pipe 11 having a valve 12 therein by means of which the flow of crude liquor can be checked. Pipe 11 enters the lower portion of a reservoir 13 in which the separation of the starch solution and the impurities occur. This reservoir is provided at the bottom with a flanged lip 14. A conical bottom member 16 is provided with a lip 15 similar to the lip 14, between which a piece of heavy canvas 17 mounted on a grid 35 is firmly clamped. The conical member 16 has attached to its pointed end an air pipe 18 which is directly connected to a blower 19, said member serving as a twyer by means of which a blast of air is forced through the canvas bottom 17. The starch liquor is passed into reservoir 13 through pipe 11 as indicated at 20. When the blast of air from the twyer 16 escapes through the canvas 17 an infinite number of bubbles are caused to rise to the surface of the liquid which carry with them the impurities and form a voluminous froth, as indicated at 21. A pipe 22 leads from the top of the reservoir 13 into the interior of a closed reservoir 23 provided with an exhaust vent 24 to which a suction fan 25 is attached. By this means the froth or scum 21 which gathers in the reservoir 13 may be withdrawn and deposited into reservoir 23, where it soon breaks up, reassuming a liquid form at the bottom of said reservoir at 26. A spout 27 provided with a valve 28 is secured to the lower portion of reservoir 23 by which the liquid 26 may be drawn off and emptied into a storage tank 29, from which it may be disposed of in any suitable manner. Reservoir 13 is similarly provided with a spout 30 having a valve 31 through which the purified starch liquor may be drawn off into a tank 32.

In operating the plant the reservoir 13 is filled with liquor as indicated at 20. Both of the fans 19 and 25 are then set into operation, blower 19 forming the froth and fan 25 removing the same as it is formed. While the impurities are still present in the liquor the process of forming the froth continues. When the impurities have been removed the blower 19 is shut off and air supplied to the reservoir 13 through a pipe 33 provided with a valve 34 which permits the volume of froth or foam present in said reservoir to be completely removed. The device, however, may be operated without this expedient, as the liquid enters said reservoir near the bottom thereof and so does not destroy the foam already present. It will be noted that pipe 22 enters the reservoir 23 near the center thereof and that the exhaust pipe 24 is remotely situated from the pipe 22. This prevents the froth from being directly drawn into the suction fan 25, and also causes it to be deposited upon the bottom of the reservoir 23 without further agitating it, thus allowing the bubbles to break up again and reassume a liquid state. When all of the froth has been removed the liquids at 20 and 26 are drawn from their respective reservoirs to the storage tanks 32 and 29. A new charge of crude liquor is then drawn into reservoir 13 and the process repeated. To facilitate the process, small amounts of acids or alkalis may be added to the crude liquor which causes the gluten and fibrous material to swell and be more readily separated with the froth.

The advantages of my improved process are manifest. The separation is very quickly made and the chemical composition and condition of the starch solution proper is unchanged. The apparatus employed is very inexpensive and requires but a small amount of power and floor space, and is quite accessible for cleaning and replacing of parts.

It will, of course, be understood that the apparatus herein shown is merely typical of such apparatus as may be efficiently employed in the practice of the invention of my process. The use of closed chambers and blower and suction fans is advantageous as it keeps all parts of the material from contamination and reduces the space required in practising the process, although it is within the scope of my invention to carry the froth and the impurities thereon from the bubbling tank by other means, such as an over-flow trough and gravity discharge into the receiving tank. The use of the suction fan by producing a state of partial vacuum in the receiving chamber, however, tends to quickly disintegrate the bubbles of the froth, with the result that the froth mixture quickly reassumes a liquid form. The gluten and fibrous material in the mixture resulting from the froth may be recovered in well-known ways and may be put to use for stock food, or similar purposes.

I claim:

1. The process of separating impurities such as gluten and fibrous material from starch liquor which consists in causing the starch liquor to froth, thereby entangling said impurities in the froth, and removing the froth and said entangled impurities from the liquor by applying suction to the froth.

2. The process of separating impurities such as gluten and fibrous material from starch liquor which consists in causing the starch liquor to froth by forcing a blast of air through the same, thereby entangling said impurities in the froth, and applying suction to the froth to remove the same from the starch liquor and cause the froth to disintegrate.

3. The process of separating impurities such as gluten and fibrous material from starch liquor which consists in passing a multiplicity of fine streams of air into the starch liquor under pressure, thereby causing a voluminous froth and entangling said impurities therein, applying suction to the froth to remove the same from the starch liquor, and collecting said froth in a receptacle apart from the starch liquor.

4. The process of separating impurities such as gluten and fibrous material from starch liquor which consists in introducing the starch liquor into a receptacle, simultaneously introducing air under pressure through the said receptacle to the starch liquor into the receptacle and withdrawing air by suction from said starch liquor, thereby causing a voluminous froth to be formed and the entanglement of the impurities therein and causing the removal of said froth with said impurities from said receptacle.

In testimony whereof I affix my signature in presence of two witnesses.

HIRAM C. HOLDEN.

Witnesses:
C. C. VOGT,
CLINTON W. CLARK.